United States Patent
Kotani (10) Patent No.: US 7,229,215 B2
(45) Date of Patent: Jun. 12, 2007

(54) DOUBLE-SPLIT CAGE

(75) Inventor: Kazuyuki Kotani, Tokyo (JP)

(73) Assignee: Koyo Seiko Co., Ltd., Osaka-shi, Osaka (JP)

( * ) Notice: Subject to any disclaimer, the term of this patent is extended or adjusted under 35 U.S.C. 154(b) by 584 days.

(21) Appl. No.: 10/681,830

(22) Filed: Oct. 9, 2003

(65) Prior Publication Data

US 2004/0156571 A1    Aug. 12, 2004

(30) Foreign Application Priority Data

Oct. 10, 2002    (JP)    ............ P. 2002-297919

(51) Int. Cl.
*F16C 33/46*    (2006.01)
*F16C 33/48*    (2006.01)

(52) U.S. Cl. ............ 384/580; 384/572; 384/575

(58) Field of Classification Search ............ 384/572, 384/577, 575, 578
See application file for complete search history.

(56) References Cited

U.S. PATENT DOCUMENTS

| | | | | |
|---|---|---|---|---|
| 2,729,520 A | * | 1/1956 | Ritchie et al. | 384/577 |
| 5,044,787 A | * | 9/1991 | Hupfer et al. | 384/572 |
| 5,255,985 A | * | 10/1993 | Alling | 384/575 |
| 6,039,475 A | * | 3/2000 | Furukawa et al. | 384/580 |
| 6,261,005 B1 | * | 7/2001 | Winkler et al. | 384/577 |
| 2002/0085783 A1 | * | 7/2002 | Yokota | 384/577 |

FOREIGN PATENT DOCUMENTS

| | | |
|---|---|---|
| DE | 16 25 643 A | 9/1970 |
| DE | 87 15 732 U1 | 1/1988 |
| DE | 39 17 759 A1 | 7/1989 |
| EP | 1 219 842 A2 | 7/2002 |
| JP | 6-6746 | 1/1994 |
| JP | 2000240660 A | 9/2000 |

* cited by examiner

*Primary Examiner*—Thomas R. Hannon
*Assistant Examiner*—Justin Krause
(74) *Attorney, Agent, or Firm*—McGinn IP Law Group, PLLC (57) ABSTRACT

A double-split cage includes a strip-shaped metallic sheet curved into a semi-cylindrical shape and having several pockets for accommodating a single row of rollers arranged in the circumferential direction. The strip-shaped metallic sheet has two arch portions separately arranged in the axial direction and includes pillar portions arranged at several positions of both arch portions in the circumferential direction. Both arch portions have protrusions protruding from the pillar portions at both end portions in the circumferential direction, and a forward end portion of each protrusion is chamfered at a corner outside in the axial direction. Length of the chamfered portion in the circumferential direction is larger than the protruding length of each protrusion.

19 Claims, 13 Drawing Sheets

ASSEMBLING DIRECTION

ASSEMBLING DIRECTION

ASSEMBLING DIRECTION

DOUBLE-SPLIT CAGE

BACKGROUND OF THE INVENTION

The present invention relates to a double-split cage used for a roller bearing.

Conventionally, two semi-cylindrical cages are used by combining it with each other. The double-split cage is formed into a semi-cylindrical shape and provided with pockets for accommodating rollers at several positions in the circumferential direction (refer to Japanese Utility Model Publication Hei. 06-6746).

This double-split cage is manufactured so that the pockets for accommodating rollers are formed through a long strip-shaped metallic sheet and the long strip-shaped metallic sheet is curved into a semicircular shape and cut off. In this case, a portion of the pillar portion located between the pockets in the circumferential direction is cut.

When the strip-shaped metallic sheet is cut off at the position of the pillar portion, the width of the pillar portions in the circumferential direction located at opposite end portions of the strip-shaped metallic sheet in the circumferential direction is reduced after the completion of cutting. Therefore, the mechanical strength of the pillar portion deteriorates and the durability is deteriorated. In order to solve the above problems of lack of the mechanical strength, it could be considered that the width in the circumferential direction of the pillar portions to be cut is made to be larger than the width in the circumferential direction of the other pillar portions. However, in this case, the machining becomes complicated because the punching pitch must be changed when the pockets are formed by means of punching.

Figure 10:
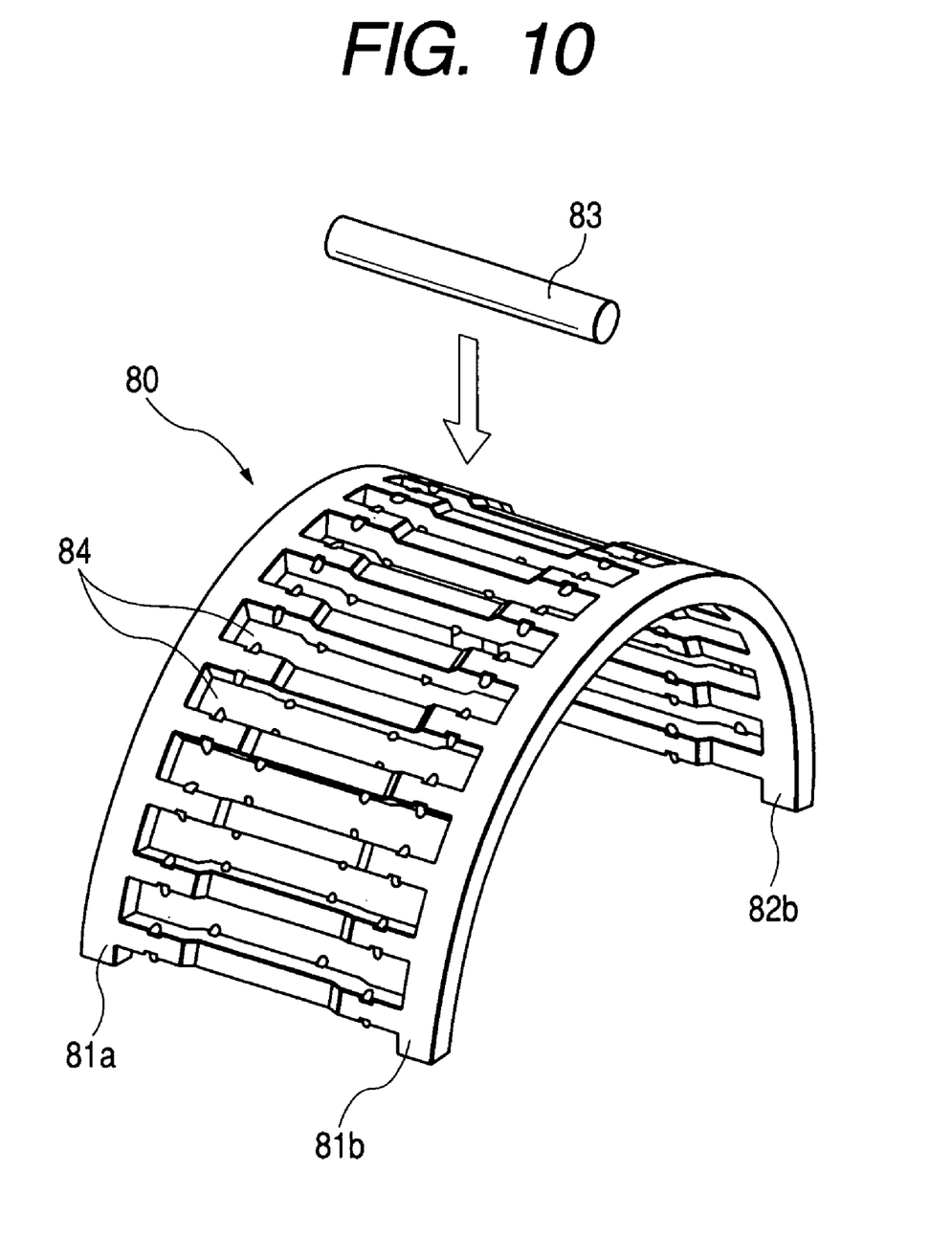
FIG. 10 is a view showing the double-split cage of a conventional example, wherein FIG. 10 corresponds to FIG. 1.
Figure 11:
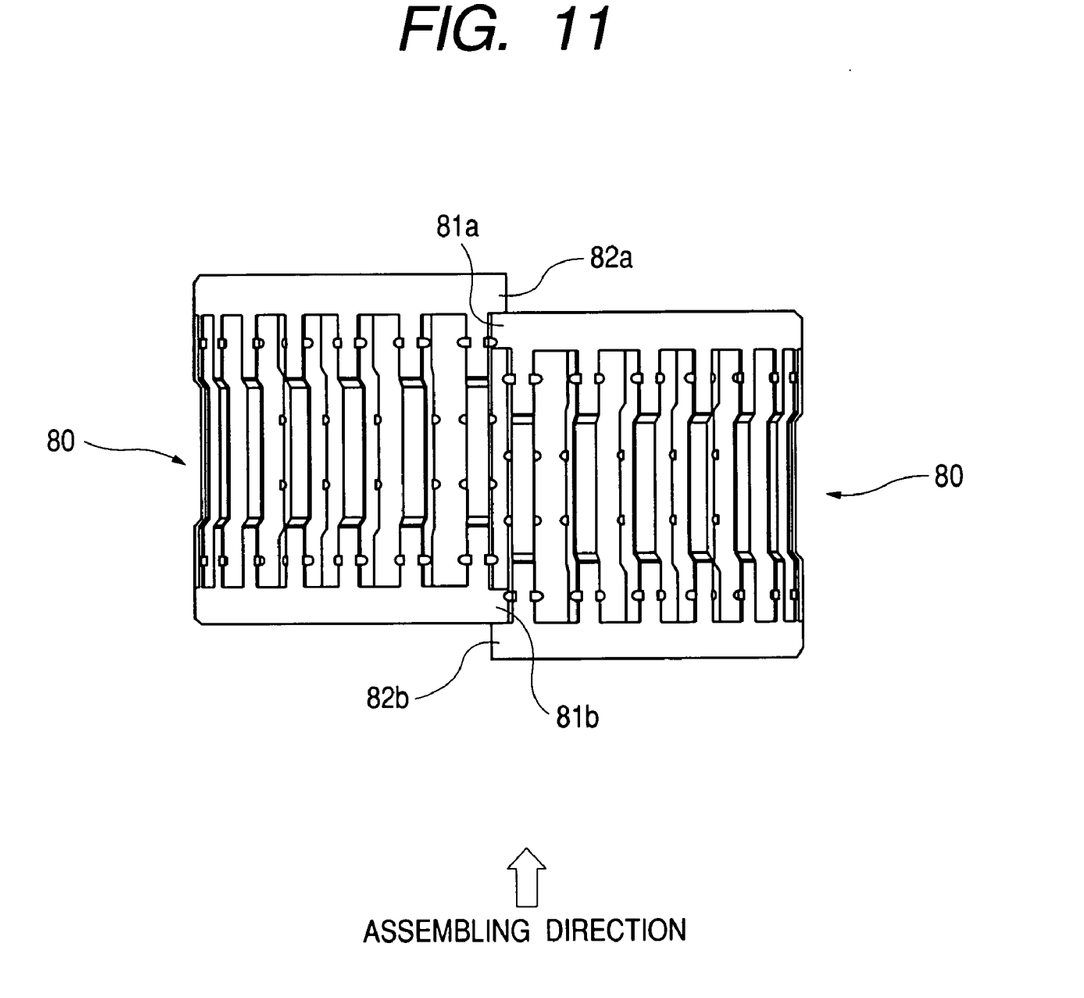
FIG. 11 is a view showing the double-split cage of FIG. 10, wherein FIG. 11 corresponds to FIG. 6.

On the other hand, when the strip-shaped metallic sheet is cut off, it is possible to cut off the strip-shaped metallic sheet at the position of the pocket. In this case, as shown in FIG. 10, protrusions 81a, 81b, 82a, 82b are formed on opposite end sides in the axial direction at opposite end portions in the circumferential direction of the double-split cage 80. In the case of this double-split cage 80, the following problems may be encountered. When two cages, which are formed into a pair, are incorporated into a place where the double-split cages 80 are used, if the pair of double-split cages 80, 80 are shifted in the axial direction, the protrusions 81a, 81b, 82a, 82b at opposite end portions in the circumferential direction of the two double-split cages 80, 80 may be hooked at each other. In order to solve this problem, the positional correction should be conducted to shift the two double-split cages 80, 80 in the axial direction so that they can be appropriately opposed to each other. However, since the protrusions 81a, 81b, 82a, 82b of the two double-split cages 80, 80 are overlapped and hooked at each other in the axial direction, it becomes difficult to correct the shift of the protrusions.

Figure 12:
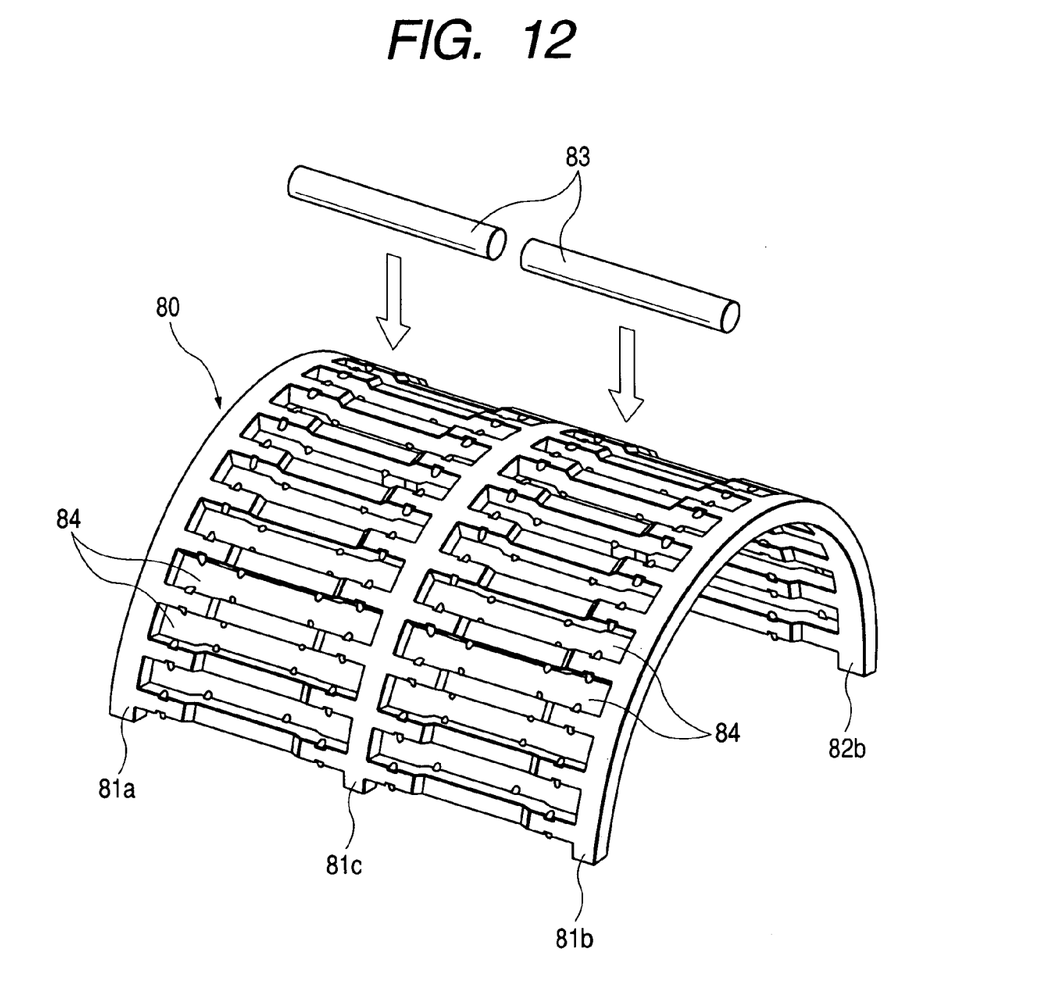
FIG. 12 is a view showing the double-split cage of another conventional example, wherein FIG. 12 corresponds to FIG. 7.
Figure 13:
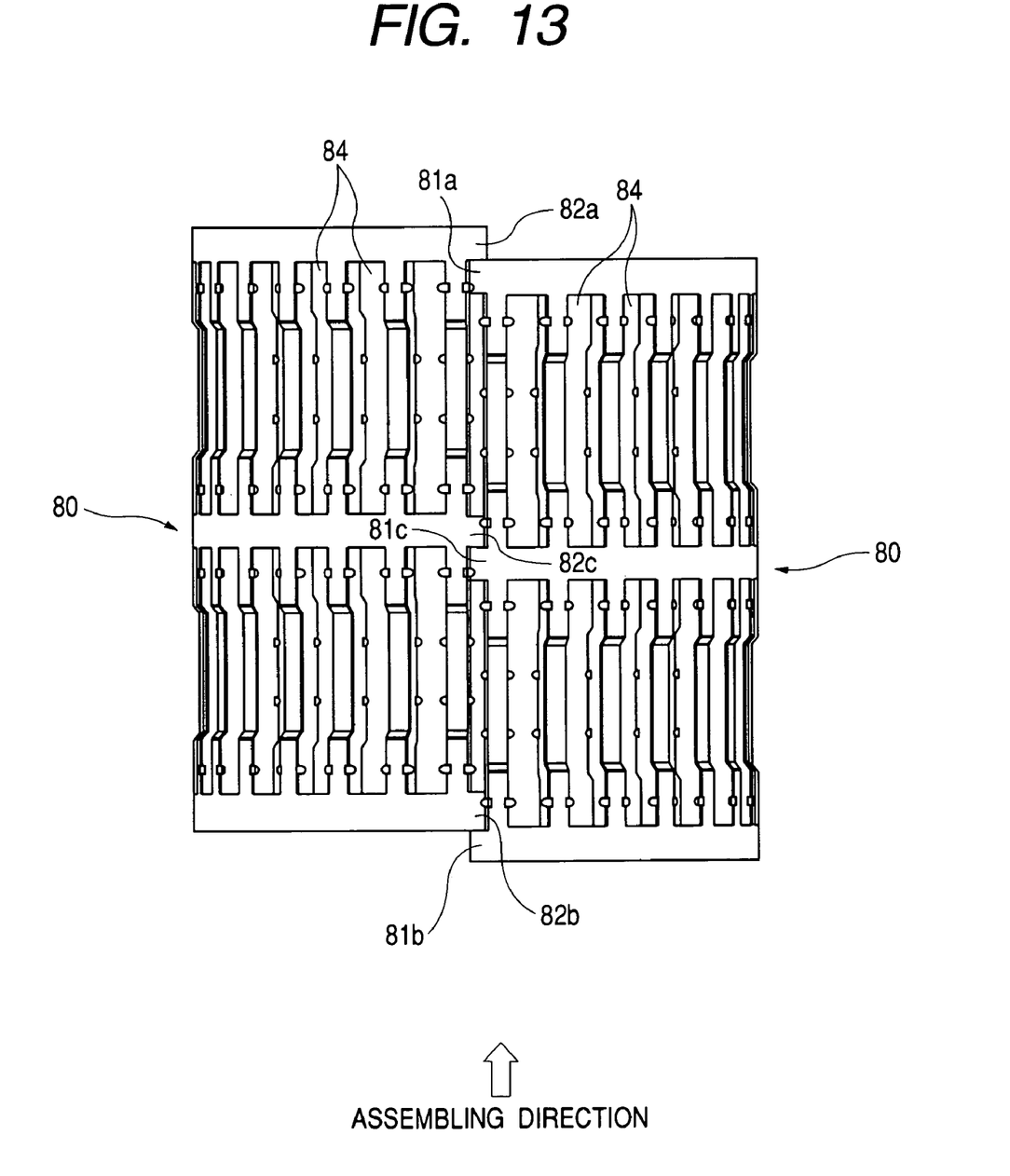
FIG. 13 is a view showing the double-split cage of FIG. 12, wherein FIG. 13 corresponds to FIG. 9.

In this connection, as shown in FIG. 12, in the case of the double-split cage 80 having the pockets 84 in which two rows of rollers 83 are accommodated in the axial direction, if cutting is conducted so that the strip-shaped sheet is cut off in the width in the circumferential direction of the pocket 84 in the manufacturing process, the protrusions 81a, 81b, 81c, 82a, 82b, 82c are formed at three positions in the axial direction in the same manner as described above. Accordingly, the same problems as those described above are caused as shown in FIG. 13.

SUMMARY OF THE INVENTION

In order to solve the aforesaid problem, the invention is characterized by having the following arrangement.

(1) A double-split cage comprising:
a strip-shaped sheet which is curved into a semi-cylindrical shape and includes pockets for accommodating a row of rollers arranged in a circumferential direction, the strip-shaped sheet including,
two arch portions separately arranged in an axial direction,
pillar portions arranged in the circumferential direction for connecting the arch portions together,
protrusions protruding in the circumferential direction by a first length from the pillar portions located at opposite distal ends in the circumferential direction, which are provided at opposite distal ends of arch portions, respectively, and
chamfered portions having a second length in the circumferential direction formed at corners outside in the axial direction of the protrusions, respectively, wherein the second length of the chamfered portions is larger than the first length of the protrusions.

(2) The double-split cage according to (1), wherein the protrusions are formed by cutting positions of the arch portions corresponding to one of the pockets so that the protrusions have the first length.

(3) The double-split cage according to (1), wherein the strip-shaped sheet includes a central arch portion interposed between the arch portions which divides the pockets, and
connection portions of the pillar portions located at the opposite distal ends with the central arch portion are recessed in the circumferential direction to form recessed portions.

(4) The double-split cage according to (1), wherein inclination angle of the chamfered portion with respect to the circumferential direction is set at 30 to 60 degrees.

(5) The double-split cage according to (4), wherein the inclination angle is set at 45 to 60 degrees.

DETAILED DESCRIPTION OF PREFERRED EMBODIMENTS

First Embodiment

FIGS. 1 to 6 are views showing a first embodiment according to the present invention. A double-split cage 1 are provided with pockets 2 for accommodating a single row of rollers at several positions in the circumferential direction on a strip-shaped metallic sheet curved into a semi-cylindrical shape. The half roller bearing is constituted so that the rollers 3 are accommodated in the pockets 2 of this double-split cage 1.

Figure 1:
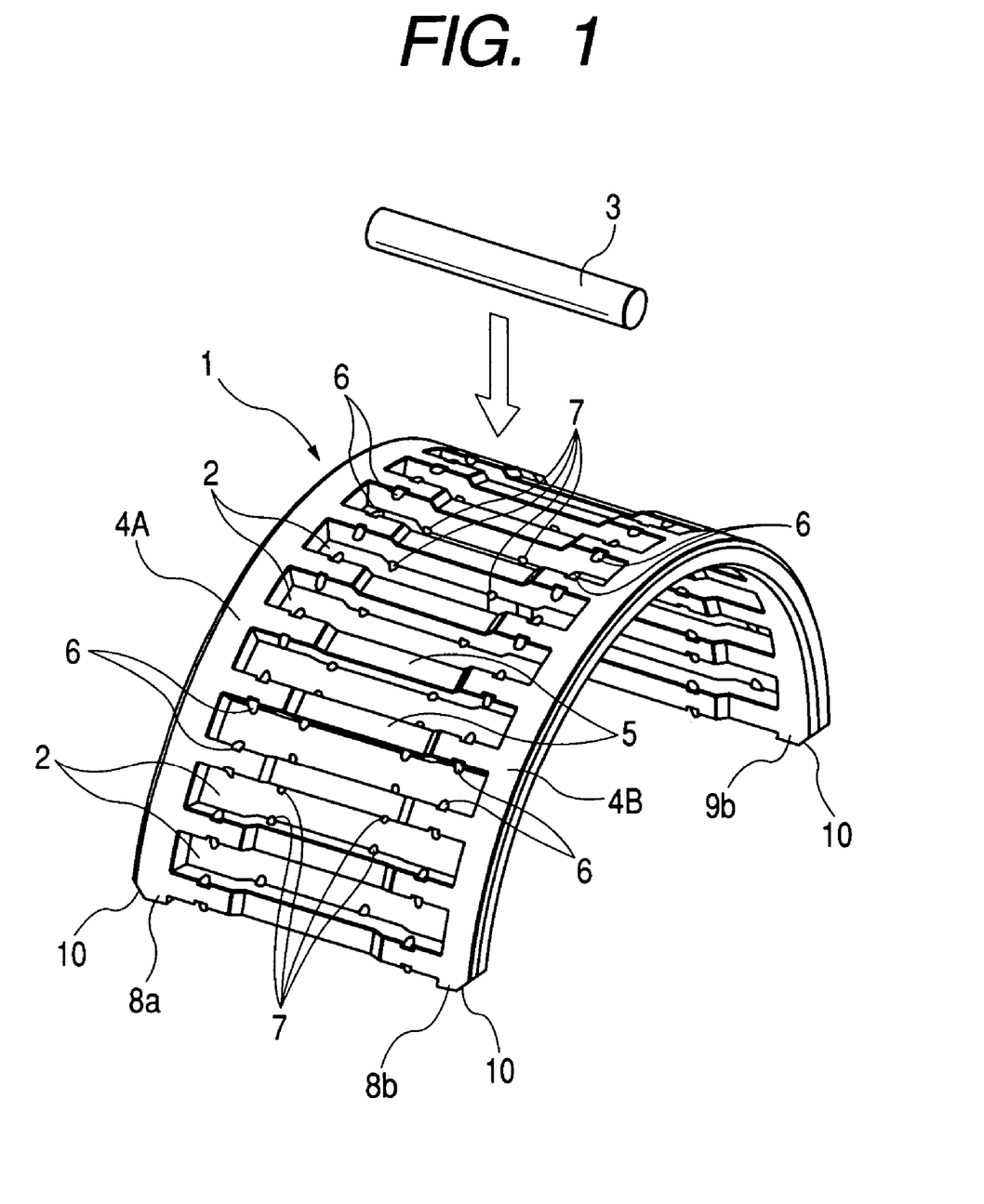
FIG. 1 is a perspective view showing a double-split cage of Embodiment 1 of the present invention.
Figure 2:
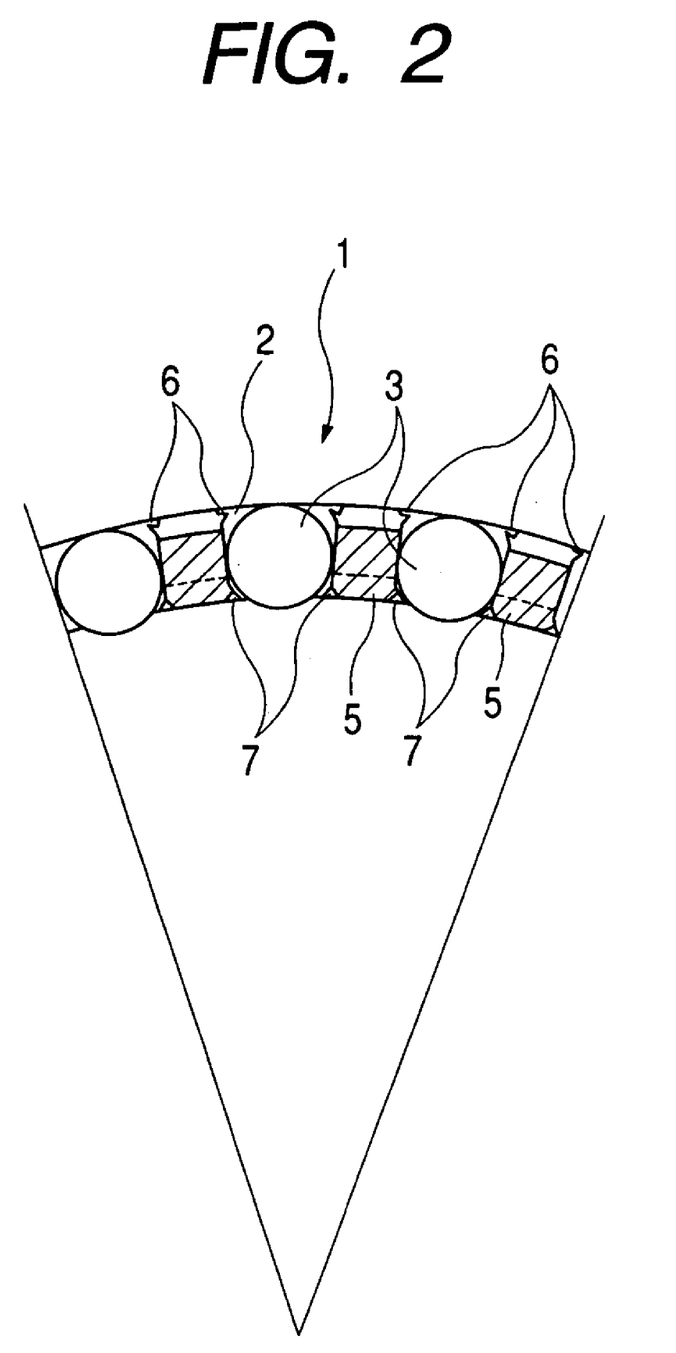
FIG. 2 is a longitudinally sectional view of the double-split cage shown in FIG. 1.
Figure 3:
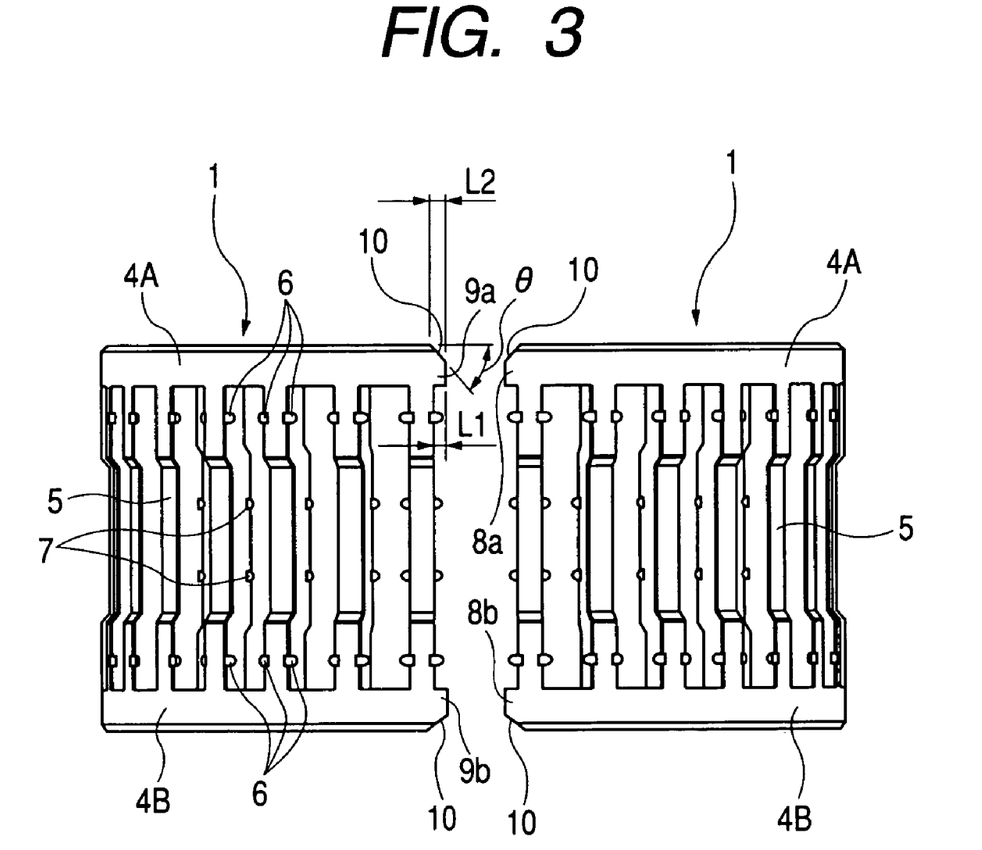
FIG. 3 is a plan view showing a state in which two double-split cages of FIG. 1 are opposed to each other.

The cross section of the above double-split cage 1 is formed into a substantial M-shape. The double-split cage 1 includes: arch portions 4A, 4B which are arranged being separated from each other in the axial direction; and pillar portions 5 provided at several positions in the circumferential direction of both arch portions 4A 4B to connect the arch portions 4A and 4B. In this connection, pawl-shaped stopping pieces 6, 7 for preventing the rollers from coming out from the pockets 2 are provided on the outer diameter side and the inner diameter side of opposite sides of the pillar portion 5 in the circumferential direction.

Protrusions 8a, 8b, 9a, 9b protruding from the pillar portions 5 of opposite end portions in the circumferential direction are provided at opposite end portions in the circumferential direction of both arch portions 4A, 4B. Chamfered portions 10 are formed at the corner portions outside in the axial direction of the protrusions 8a, 8b, 9a, 9b.

In this connection, length L2 in the circumferential direction of the chamfered portion 10 is set to be longer than protruding length L1 of the protrusions 8a, 8b, 9a, 9b. Inclination angle θ of the above chamfered portion 10 can be set at, for example, 30 to 60 degrees. It is preferable that inclination angle θ of the above chamfered portion 10 is set at 45 to 60 degrees. In this embodiment, inclination angle θ of the above chamfered portion 10 is set at 45 degrees. In this connection, the smaller this inclination angle θ of the above chamfered portion 10 is set, the more the width of the faces opposed to each other in the circumferential direction is increased when two double-split cages 1 are combined with each other and incorporated into a place where they are used, however, it becomes difficult to conduct correcting motions when the two double-split cages 1 are shifted in the axial direction in the process of incorporating the two double-split cages 1. On the other hand, the larger this inclination angle θ of the above chamfered portion 10 is set than 45 degrees, the smaller the width of the faces opposed to each other in the circumferential direction is decreased although the correcting motions of correcting the positional shift becomes easy. Taking the above fact into the consideration, inclination angle θ has been set as described above.

Figure 4A:
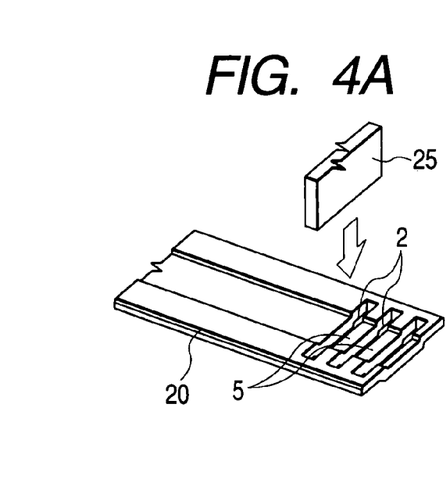
FIGS. 4A–4C show a schematic illustration showing a procedure of manufacturing the double-split cage of FIG. 1.
Figure 4B:
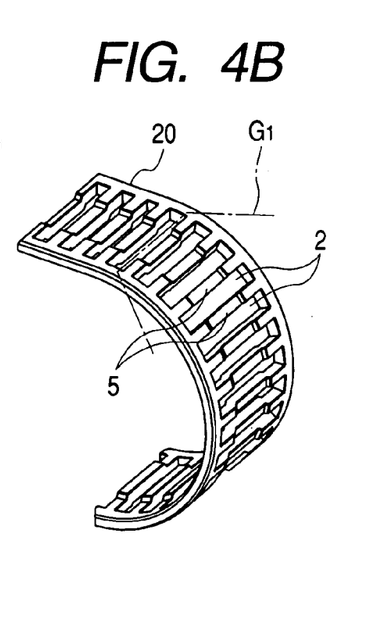
Figure 4C:
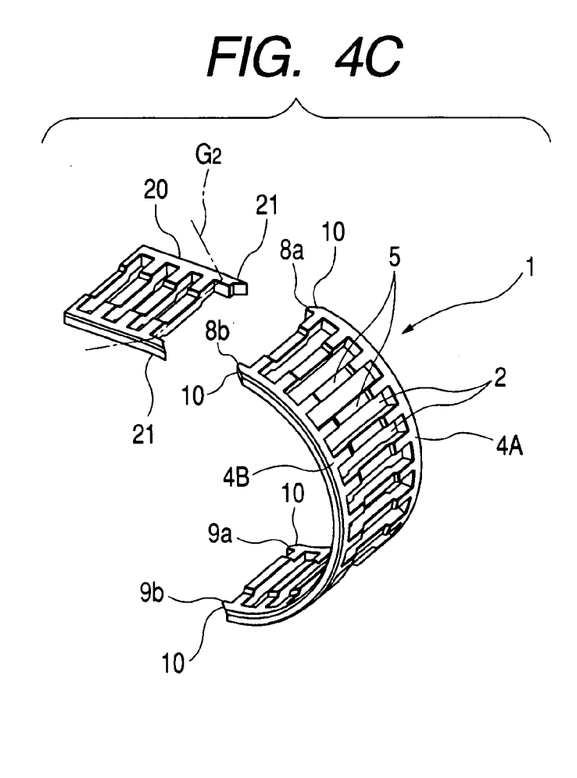

The procedure of manufacturing the above double-split cage 1 will be explained below. First of all, as shown in FIG. 4A, one long strip-shaped metallic sheet 20 is formed in a shape so that the cross section can become an M-shape. Then, the rectangular pockets 2 are formed in the longitudinal direction of this strip-shaped metallic sheet 20 with the punching tool 25. After that, predetermined positions of the pillar portions 5 are plastically deformed by stamping so that the pawl-shaped stopping pieces 6, 7 are formed. In FIG. 4, these pawl-shaped stopping pieces 6, 7 are omitted. Then, as shown in FIG. 4B, the strip-shaped metallic sheet is curved into a semi-cylindrical shape by a predetermined length and cut off as shown by one-dotted chain line G1 in the view. This cutting position is determined to be a position in the intermediate portion in the circumferential direction of the pocket 2 in the two arch portions 4A, 4B as close as possible to the pillar portion 5. Due to the foregoing, the double-split cage 1 shown in FIG. 4C can be obtained. After that, as shown in FIG. 4C, the cutting end 21, which has been left on the strip-shaped metallic plate 20, is cut off again as shown by the one-dotted chain line G2 in the view. When the procedure shown in FIGS. 4B to 4C is repeated, the double-split cage 1 can be successively manufactured.

Two cutting positions G1 and G2 are determined so that the position G1 and G2 falls in the width of the pocket 2 in the circumferential direction and are located as close as possible to the pillar portion 5. When the cutting is conducted at the two positions G1 and G2, the protruding length L1 of the protrusions 8a, 8b, 9a, 9b can be decreased as small as possible, which is preferable. In this connection, cutting may be conducted all at once at positions G1 and G2. Alternatively, the cutting for separating the double-split cage 1 from the strip-shaped metallic sheet and the machining for forming the chamfered portions 10 may be separately conducted.

Figure 5:
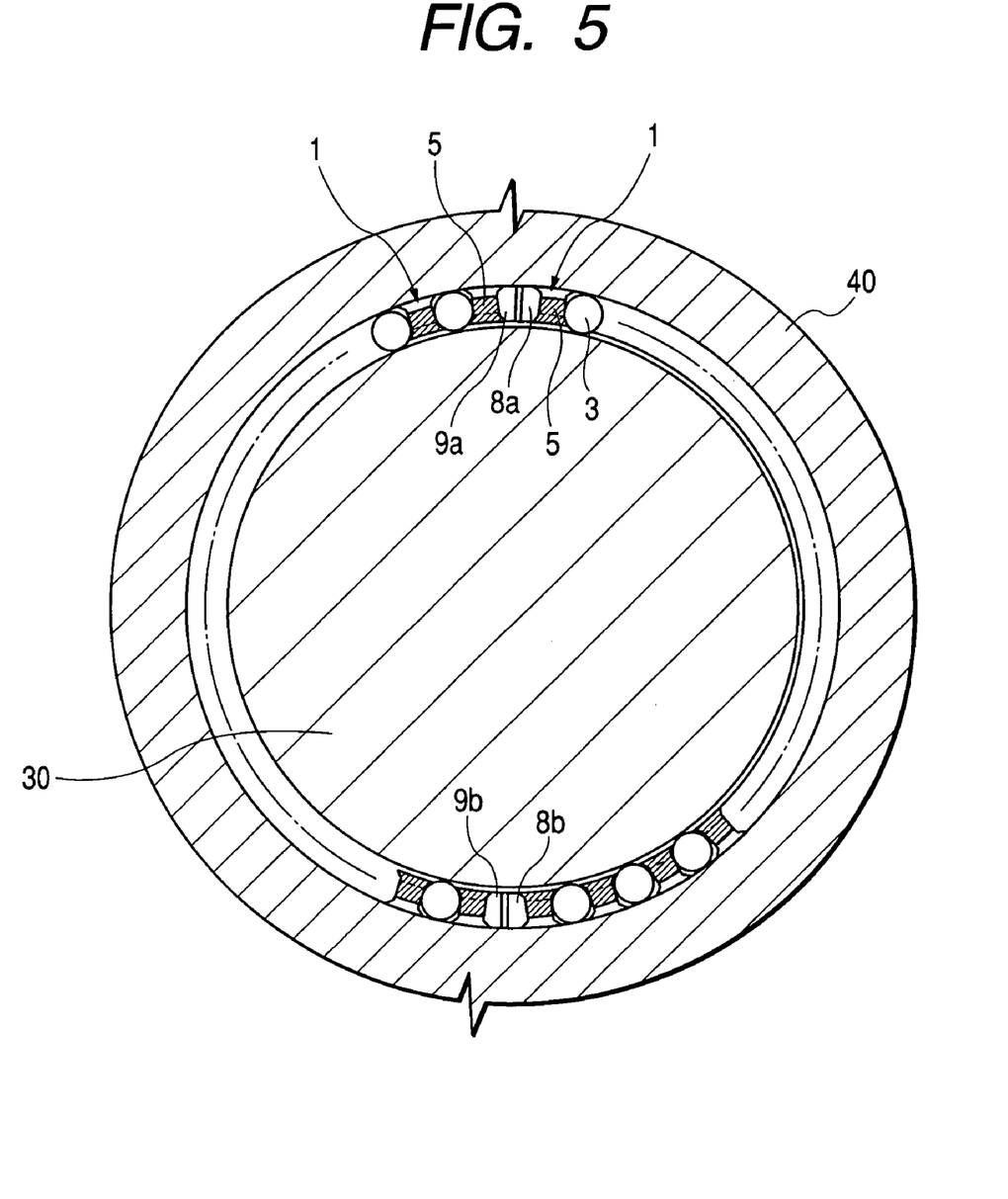
FIG. 5 is a view showing a state of use of the double-split cage of FIG. 1.

The half roller bearing is constituted by accommodating the rollers 3 in the pockets 2 of the above double-split cage 1. When two half roller bearings are combined with each other and incorporated between the shaft body 30 and the outer cylinder 40, it can be put into practical use. Specifically, this double-split cage 1 is used, for example, at a supporting portion of a speed change gear of a manual transmission. In this case, the speed change gear corresponds to the aforementioned outer cylinder 40.

Figure 6:
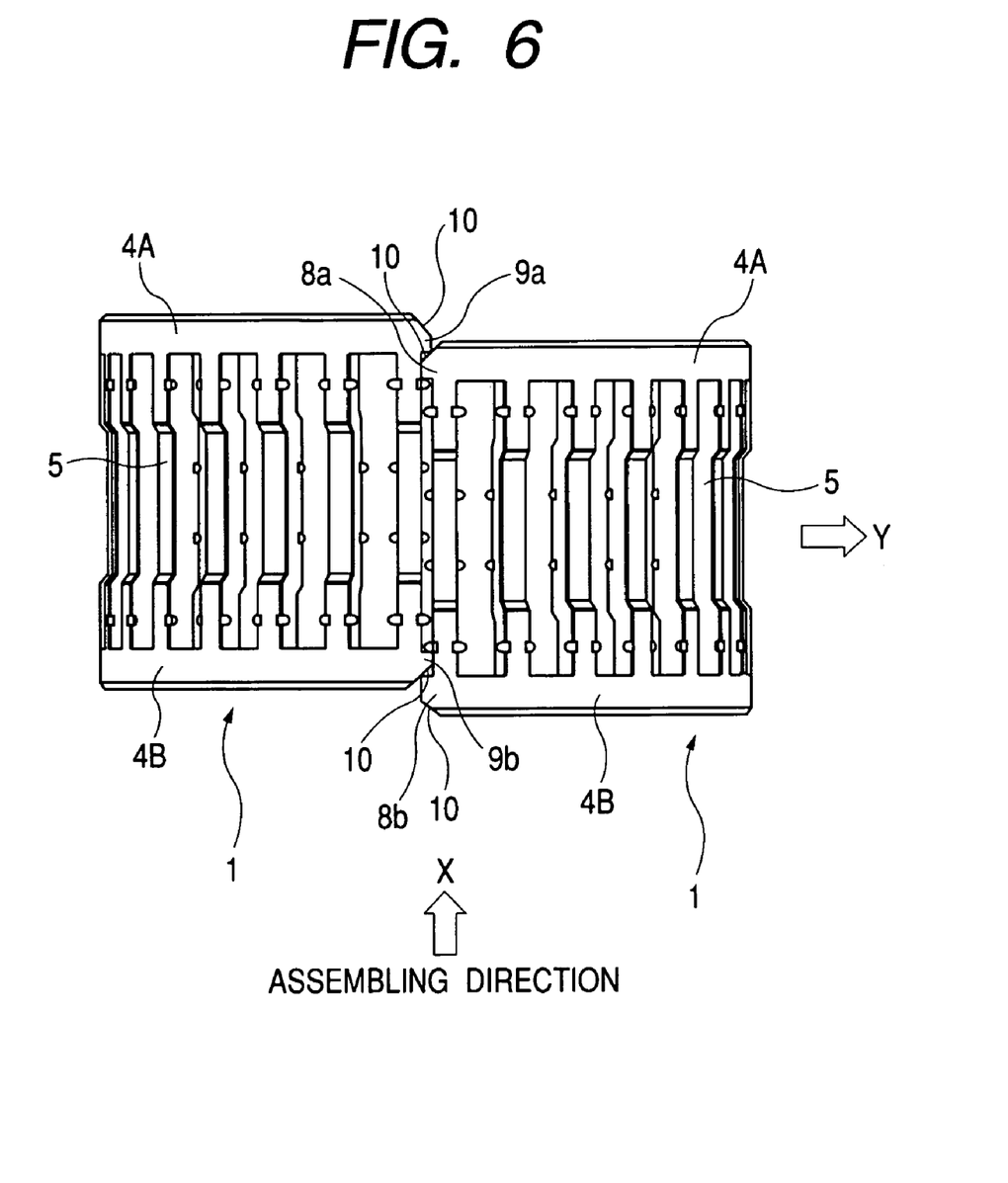
FIG. 6 is a view showing a state in which two double-split cages are positionally shifted in FIG. 5.

In the process in which the two double-split cages 1 are combined with each other and incorporated into a place where they are used, when the two double-split cages 1, 1 are shifted in the axial direction as shown in FIG. 6, the protrusions 8a, 8b (9a, 9b) on one side in the circumferential direction of the cage are overlapped and hooked at each other in the axial direction. In this case, it is necessary to correct the shift. This correction can be simply conducted, which will be explained below.

When the positional shaft is caused as described above, the chamfered portions 10 of the two protrusions 8a, 9b located inner side of the protrusions 9a, 8b come into contact with the corner portions inside in the axial direction of the two protrusions 9a, 8b located outer side of the protrusions 8a, 9b. In this case, in FIG. 6, when the double-split cage 1 located on the worker's side in the assembling direction is pushed to the inner side in the assembling direction (direction indicated by arrow X), the double-split cage 1 located on the worker's side in the assembling direction is moved in the circumferential direction (direction indicated by arrow Y) by the chamfered portions 10. Accordingly, the above positional shift can be corrected and both double-split cages 1, 1 are appropriately opposed to each other in the circumferential direction. The force to move the double-split cage in the circumferential direction is a component force of the above pushing force.

As explained above, in case of the double-split cage 1 of the first embodiment, even if the two double-split cages 1 are shifted from each other in the process in which they are incorporated into a place where they are used, the position of the two double-split cages can be corrected into a proper state by the simple operation in which the double-split cage 1 located on the worker's side in the assembling direction is simply pushed.

Second Embodiment

Figure 7:
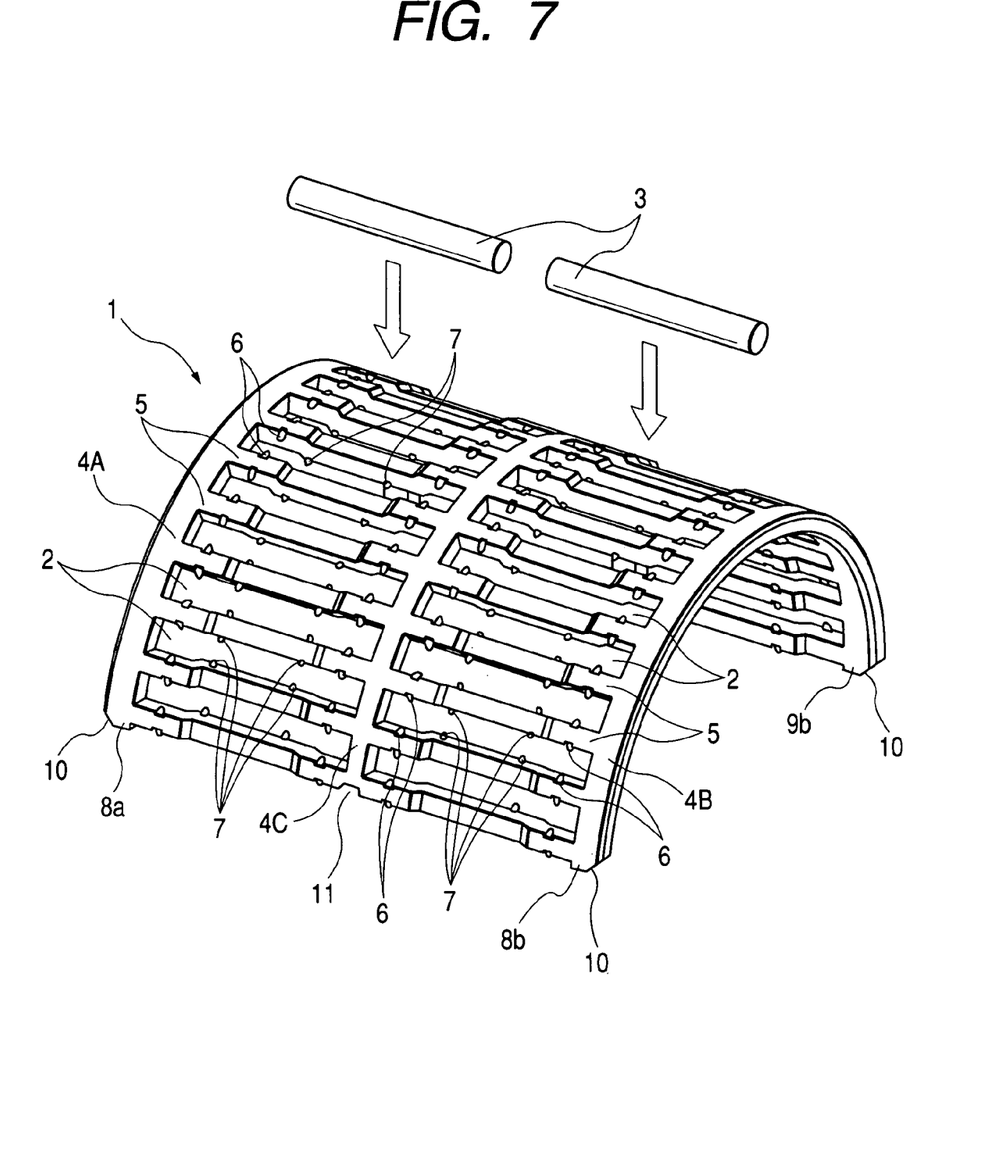
FIG. 7 is a view showing the double-split cage of Embodiment 2 of the present invention, wherein FIG. 7 corresponds to FIG. 1.
Figure 8:
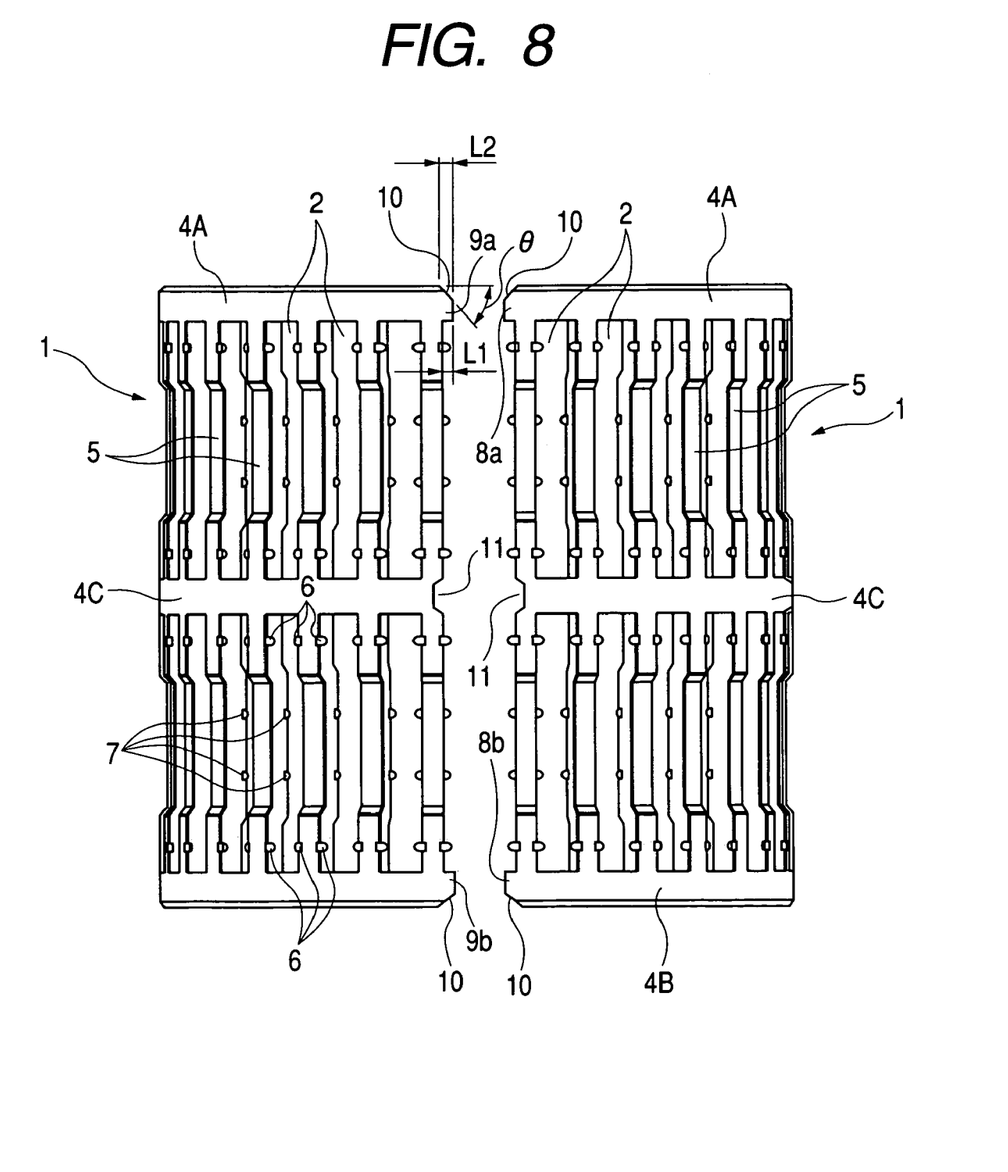
FIG. 8 is a view showing the double-split cage of FIG. 7, wherein FIG. 8 corresponds to FIG. 3.
Figure 9:
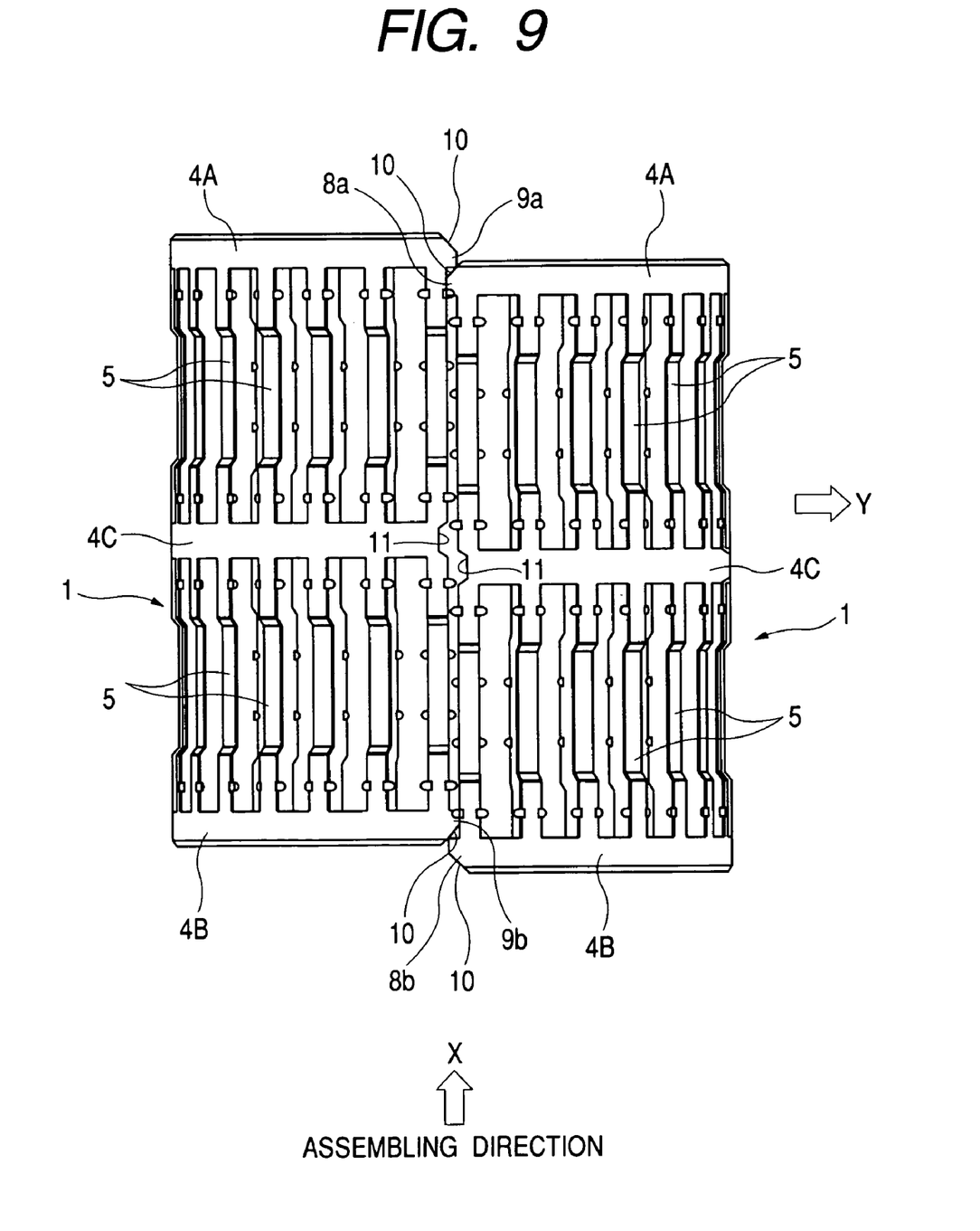
FIG. 9 is a view showing the double-split cage of FIG. 6, wherein FIG. 9 corresponds to FIG. 6.

FIGS. 7 to 9 are views showing a second embodiment according to the present invention. The double-split cage 1 of the second embodiment is constituted in such a manner that the pockets 2, 2 for accommodating a plurality of rows of rollers are provided at several positions in the circumferential direction of the strip-shaped metallic sheet curved into a semi-cylindrical shape. The half roller bearing is constituted by accommodating the rollers 3 in the pockets 2 of this double-split cage 1.

In this double-split cage 1, three arch portions 4A, 4B, 4C are separately arranged in the axial direction, and the pillar portions 5 are provided at several positions in the circumferential direction of the arch portions 4A, 4B, 4C.

In the case of the second embodiment, protrusions 8a, 8b, 9a, 9b protruding from the pillar portions 5 at opposite end portions in the circumferential direction are provided at opposite end portions in the circumferential direction of the arch portions 4A, 4B on each side. Recess portions 11 formed by recessing the side of the pillar portions 5 at opposite end portions in the circumferential direction are provided at opposite end portions in the circumferential direction of the central arch portion 4C. The inner faces at opposite end portions in the axial direction of this recess portion 11 are formed oblique. Alternatively, the inner faces at both end portions in the axial direction of this recess portion 11 may not be formed oblique.

In the corner portions outside in the axial direction of the protrusions 8a, 8b, 9a, 9b, the chamfered portions 10 are provided in the same manner as that of the first embodiment.

In the second embodiment, in the same manner as that of the first embodiment, when both double-split cages 1, 1 are positionally shifted as shown in FIG. 9 in the process in which the two double-split cages 1 are combined with each other and incorporated into a place where they are used, the positional shift can be simply corrected.

In this connection, in the case of the double-split cage 1 having a plurality of rows of pockets 2 described above, when the middle portion in the width direction of the pocket 84 is cut off in the manufacturing process, protrusions are formed at three positions in the axial direction as shown in FIG. 12 of the conventional example. However, in this Embodiment 2, no protrusions are left at opposite end portions in the circumferential direction of the central arch portion 4C, and the recess portions 11 are provided. The reason will be explained below.

The present inventors considered as follows. Even in the case of the double-split cage 1 having a plurality of rows of pockets 2, for example, the protrusions at opposite end portions in the circumferential direction of the central arch portion 4C may be left and the corner portions on opposite sides in the axial direction may be chamfered. However, when the protrusions are left at opposite end portions in the circumferential direction of the central arch portion 4C, the protrusions themselves get in the way of incorporating the two double-split cages 1, 1, which is not preferable. In order to avoid the above not preferable circumstances, faces of both end portions in the circumferential direction of the central arch portion 4C may be made to be the same as the faces of the pillar portions 5, 5 on opposite sides in the axial direction. However, when cutting is conducted in the above manner, small protrusions are actually left in many cases. Therefore, as shown in Embodiment 2, the recess portions 11 are provided at opposite end portions in the circumferential direction of the central arch portion 4C.

In this connection, it should be noted that the present invention is not limited to the above specific embodiment, and variations and applications may be made without departing the spirit and scope of the present invention.

(1) Concerning the cutting position in the case of manufacturing the double-split cage 1 in the first and second embodiments described above, as long as the cutting position is set in the region in the width in the circumferential direction of the pocket 2 in the two arch portions 4A, 4B, it is possible to set the cutting position at any position. For example, in the two arch portions 4A, 4B, cutting is conducted at one position at the center in the width in the circumferential direction of the pocket 2, and the chamfered portions 10 can be formed after the completion of cutting.

(2) In the first and second embodiments described above, the chamfered portion 10 may not be an oblique face but a circular face. Even in this case, in the process in which two double-split cages 1 are combined with each other and incorporated into a place where they are used, when both double-split cages 1 are positionally shifted, the positional shift can be simply corrected.

According to the double-split cage of the present invention, even if a positional shift in the axial direction is caused in the process of incorporating two double-split cages into a place where they are used, the two double-split cages can be corrected into a proper state by a very simple correcting work in which the double-split cage on the worker's side in the assembling direction is only pushed

What is claimed is:

1. A double-split cage comprising:
   a strip-shaped sheet which is curved into a semi-cylindrical shape and includes pockets for accommodating a row of rollers arranged in a circumferential direction, the strip-shaped sheet including,
   two arch portions separately arranged in an axial direction;
   pillar portions arranged in the circumferential direction for connecting the arch portions together;
   protrusions protruding in the circumferential direction by a first length from the pillar portions located at opposite distal ends in the circumferential direction, which are provided at opposite distal ends of the two arch portions, respectively; and
   chamfered portions having a second length in the circumferential direction formed at corners outside in the axial direction of the protrusions, respectively, wherein the second length of the chamfered portions is larger than the first length of the protrusions.

2. The double-split cage according to claim 1, wherein the protrusions are formed by cutting positions of the arch portions corresponding to one of the pockets such that the protrusions have the first length.

3. The double-split cage according to claim 1, wherein the pillar portions are arranged opposite to one another in the axial direction.

4. The double-split cage according to claim 1, wherein an inclination angle of the chamfered portion with respect to the circumferential direction is set at 30 to 60 degrees.

5. The double-split cage according to claim 4, wherein the inclination angle is set at 45 to 60 degrees.

6. The double-spilt cage according to claim 1, further comprising pawl-shaped stops protruding from the pillar portions to retain a roller.

7. The double-split cage according to claim 6, wherein the pawl-shaped stops protrude toward one another from opposed pillar portions.

8. The double-split cage according to claim 1, wherein
the strip-shaped sheet includes a central arch portion interposed between the arch portions which divides the pockets, and
connection portions of the pillar portions located at the opposite distal ends with the central arch portion are recessed in the circumferential direction to form recessed portions.

9. The double-split cage according to claim 8, wherein the double-split cage comprises a substantially M-shape.

10. The double-split cage according to claim 8, wherein the recessed portions comprise oblique faces formed at opposite ends of the recessed portions.

11. A double-split cage, comprising:
a strip-shaped sheet which is curved into a semi-cylindrical shape and includes pockets for accommodating a row of rollers arranged in a circumferential direction, the strip-shaped sheet including,
three arch portions separately arranged in an axial direction;
pillar portions arranged in the circumferential direction for connecting the arch portions together;
protrusions protruding in the circumferential direction by a first length from the pillar portions located at opposite distal ends in the circumferential direction, which are provided at opposite distal ends of the two outer arch portions, respectively; and
chamfered portions having a second length in the circumferential direction formed at corners outside in the axial direction of the protrusions, respectively, wherein the second length of the chamfered portions is larger than the first length of the protrusions.

12. A double-split cage according to claim 11, wherein a middle arch portion includes a recess at opposite distal ends in the circumferential direction.

13. The double-split cage according to claim 11, wherein the protrusions are formed by cutting positions of the arch portions corresponding to one of the pockets such that the protrusions have the first length.

14. The double-split cage according to claim 11, wherein
the pillar portions include connection portions located at the opposite distal ends of the pillar portions that are recessed in the circumferential direction to form recessed portions.

15. The double-split cage according to claim 11, wherein an inclination angle of the chamfered portion with respect to the circumferential direction is set at 30 to 60 degrees.

16. The double-split cage according to claim 11, wherein an inclination angle of the chamfered portion with respect to the circumferential direction is set at 45 to 60 degrees.

17. The double-split cage according to claim 11, wherein the pillar portions are arranged opposite to one another in the axial direction.

18. The double-split cage according to claim 11, further comprising pawl-shaped stops protruding from the pillar portions to retain a roller.

19. The double-split cage according to claim 18, wherein the pawl-shaped stops protrude toward one another from opposed pillar portions.

* * * * *